C. H. WALKER.
ATTACHMENT FOR LEVERS.
APPLICATION FILED FEB. 12, 1917.
1,249,260.
Patented Dec. 4, 1917.
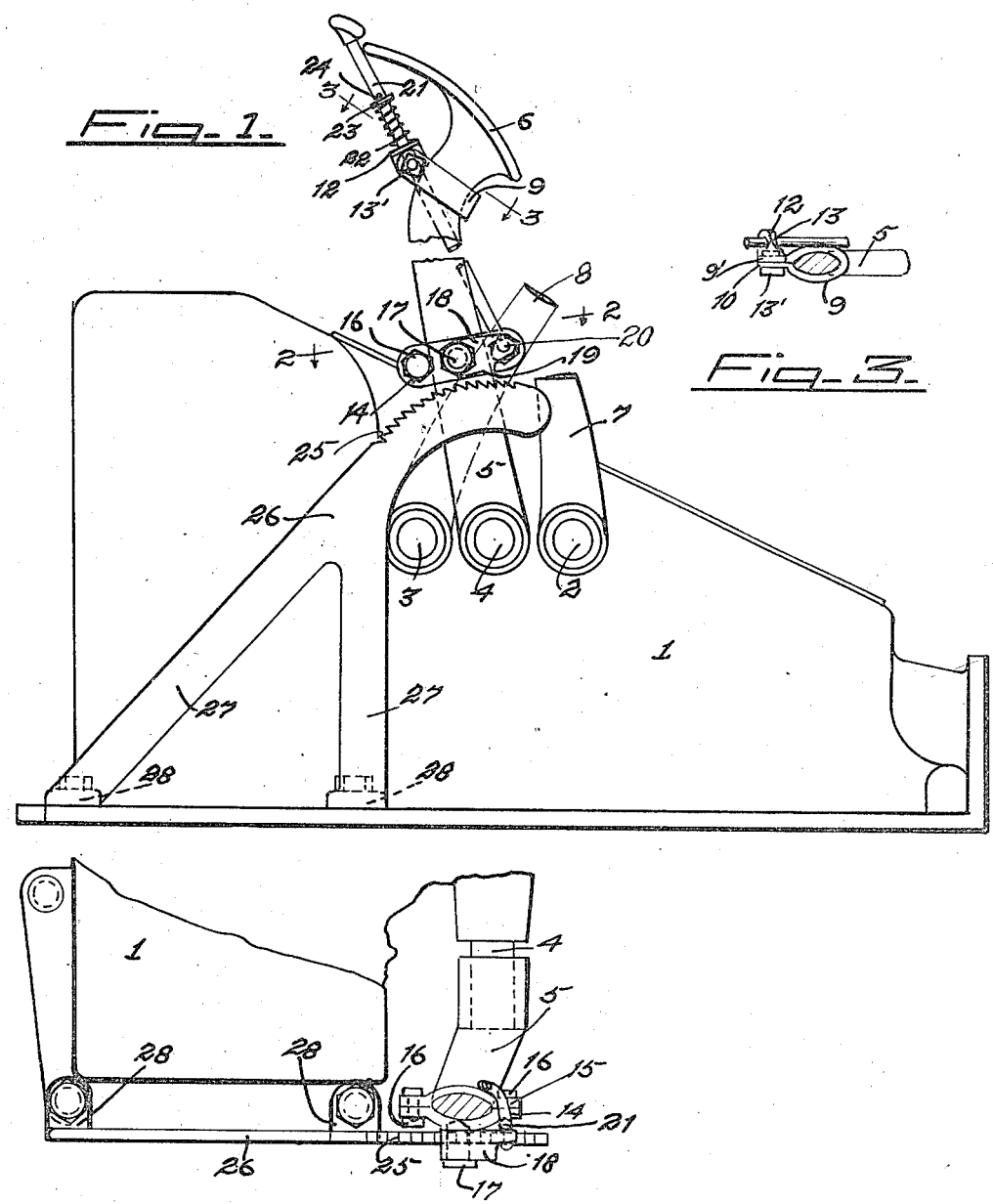
WITNESS:
INVENTOR.
BY
ATTORNEYS.

UNITED STATES PATENT OFFICE.

CLARENCE H. WALKER, OF BURLINGAME, CALIFORNIA.

ATTACHMENT FOR LEVERS.

1,249,260. Specification of Letters Patent. Patented Dec. 4, 1917.

Application filed February 12, 1917. Serial No. 148,021.

*To all whom it may concern:*

Be it known that I, CLARENCE H. WALKER, a citizen of the United States, residing at Burlingame, in the county of San Mateo and State of California, have invented certain new and useful Improvements in Attachments for Levers, of which the following is a specification.

In motor vehicles employing the planetary type of transmission, it is necessary when running in low speed to maintain pressure on a lever usually a foot pedal, in order to maintain the proper transmission element in engagement. This is particularly true in the Ford make of vehicles, and when traveling any great distance in low speed, such as in congested traffic, or in ascending a long hill, it is very tiresome for the operator to maintain the continued pressure on the low speed pedal or lever.

The present invention relates to an attachment for the transmission controlling pedals or levers of motor vehicles, by the employment of which the operator is relieved from maintaining tension on the pedal when it is desired to retain the same in its depressed position to enable the vehicle to operate in one of its lower speeds.

The invention has for its principal objects to provide a construction designed to be readily attached to a pedal of the Ford type without in any way changing the pedal or mutilating the same and without the aid of a mechanic; one which is capable of operation by the movement of the foot over the pedal to throw the retaining pawl in operative position to hold the pedal in its operative or depressed position, and one which is designed to be attached without drilling or boring parts of the vehicle or pedal on which it is mounted, the bolts employed in retaining certain parts of the vehicle together being utilized.

With the above mentioned and other objects in view the invention consists in the novel construction and combination of parts hereinafter described, illustrated in the accompanying drawings and set forth in the claims hereto appended, it being understood that various changes in the form, proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in side elevation of the preferred embodiment of my invention applied to the clutch or low speed pedal of a Ford automobile.

Fig. 2 is a sectional view taken on line 2—2 of Fig. 1, viewed in the direction of the arrows.

Fig. 3 is a detailed sectional view taken on line 3—3 of Fig. 1, viewed in the direction of the arrows.

Referring more particularly to the several views of the drawings wherein like characters of reference designate corresponding parts,—1 illustrates the usual transmission cover of a Ford automobile and from one side of which projects the brake pedal shaft 2, the reverse speed shaft 3, and the low speed or commonly termed clutch shaft 4, to which is attached the clutch pedal 5 having the foot engaging face 6. To the shafts 2 and 3 are attached suitable operating levers 7 and 8.

Around the upper portion of the clutch pedal 5 below the face 6 is positioned the clamp 9 preferably formed of spring metal and the ends 9' and 10 of said clamp are so disposed as to lie parallel to and in contact with each other, as in Fig. 3, when the clamp is positioned on the pedal, as in the drawings. The end 9' of the clamp is bent laterally at right angles outwardly to the exposed face thereof, said laterally extended portion providing a guide lip 12 which is formed with a guide opening 13. A suitable bolt 13' passes through alined openings in the ends 9' and 10 of the clamp, and said bolt retains the clamp in position on the pedal. A suitable clamp comprising the spaced members 14 and 15 retained together by bolts 16, is detachably secured to the lower portion of the clutch pedal shank and from the member 14 extends the bearing 17 which pivotally mounts the pawl 18 formed with the downwardly disposed engaging tongue 19. The free end of the pawl is provided with an eye 20 through which extends the curved lower end of a controlling rod 21 disposed upwardly and passes through the guide opening 13 with its upper end terminating at the rear of the engaging face 6 at a point slightly above the rear edge of the same, as in Fig. 1 of the drawings. The pawl is normally retained in its raised or inoperative position by a spring 22 coiled about the upper end of the controlling rod 21 and interposed between the lip 12 and a suitable washer 23 limited in its movement longitudinally of the rod by a cotter pin 24.

The pawl coöperates with a suitable ratchet 25 formed in the upper end of a bracket 26. The bracket is provided with the legs or supports 27 terminating at their lower ends in the offset feet 28, each provided with a bolt opening, the openings being adapted to register with the regular bolt openings in the side flange of the transmission cover and be secured in position by the usual bolts utilized to attach the transmission cover to the lower half of the motor crank case.

When it is desired to operate the vehicle under the low speed, it is only required that the operator press forwardly on the pedal 5 and with the toe depress the controlling rod 21, forcing the tongue 19 into engagement with the ratchet 25, thereby retaining the pedal in its operative position and enabling the operator to release his foot from the pedal while the vehicle is being operated through the reduced speed mechanism. It is only required that a slight pressure be placed on the pedal to enable the spring 22 to relieve the tongue 19 from the ratchet 25 to permit the return of the pedal to its normal position.

It is apparent that I have provided a pawl and ratchet mechanism which is capable of attachment with very little expense to the clutch or low speed pedal of a Ford automobile, without in any way changing or altering the pedal or other mechanism of the vehicle.

Having thus described my invention, what I claim is:—

In combination with a spring-pressed foot lever provided with a foot engaging surface, a pawl and ratchet mechanism for coöperating with the said lever, comprising a supporting member formed in halves for clamping to the lever below said foot engaging surface, a stud supported by said halves, a pawl pivotally supported on said stud, a ratchet with which said pawl coöperates, an operating rod pivotally connected at one end with said pawl and extending to a point above and to the rear of said foot engaging surface, a member clamped to said lever above said supporting member and provided with a portion bent to form a guide and through which the free end of said rod operates, and a spring coöperating with said rod and pawl for normally maintaining said pawl disengaged from said ratchet.

In testimony whereof I have signed my name to this specification in the presence of the subscribing witness.

CLARENCE H. WALKER.

Witness:
D. B. RICHARDS.